(12) United States Patent
Ghanwani et al.

(10) Patent No.: US 10,938,721 B2
(45) Date of Patent: Mar. 2, 2021

(54) HASH COLLISION MITIGATION SYSTEM

(71) Applicant: Dell Products L.P., Round Rock, TX (US)

(72) Inventors: Anoop Ghanwani, Roseville, CA (US); Raja Sathianarayan Jayakumar, Freemont, CA (US); Kannan Karuppiah, Santa Clara, CA (US); Chetput L. Venkataraghavan, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 16/523,838

(22) Filed: Jul. 26, 2019

(65) Prior Publication Data

US 2021/0029036 A1 Jan. 28, 2021

(51) Int. Cl.
*H04L 12/743* (2013.01)
*H04L 12/46* (2006.01)
*H04L 12/715* (2013.01)
*H04L 12/721* (2013.01)

(52) U.S. Cl.
CPC ...... *H04L 45/7453* (2013.01); *H04L 12/4641* (2013.01); *H04L 45/04* (2013.01); *H04L 45/66* (2013.01); *H04L 45/7457* (2013.01)

(58) Field of Classification Search
CPC ............. H04L 45/7453; H04L 12/4641; H04L 45/04; H04L 45/66; H04L 45/7457
USPC ........................................................ 709/238
See application file for complete search history.

(56) References Cited

U.S. PATENT DOCUMENTS

| | | | | |
|---|---|---|---|---|
| 8,289,845 | B1* | 10/2012 | Baldonado | H04L 43/16 370/230 |
| 9,008,091 | B1* | 4/2015 | Grosser, Jr. | H04L 45/00 370/392 |
| 10,033,631 | B1* | 7/2018 | Baveja | H04L 45/306 |
| 2013/0232104 | A1* | 9/2013 | Goyal | G06N 5/02 706/59 |
| 2014/0029423 | A1* | 1/2014 | Badhani | H04L 45/30 370/235 |
| 2014/0122791 | A1* | 5/2014 | Fingerhut | G11C 15/00 711/108 |

* cited by examiner

*Primary Examiner* — Wing F Chan
*Assistant Examiner* — Leon Y Tseng
(74) *Attorney, Agent, or Firm* — Haynes and Boone, LLP

(57) ABSTRACT

A hash collision mitigation system includes a source device coupled to a destination device by a networking device. The networking device receives a first packet from the source device, and uses first packet information included in the first packet to perform a hash operation on the first packet and generate a hash value. The networking device then determines that the hash value has caused a hash collision with a first hash value forwarding entry in a hash forwarding table in the networking device and, in response, generates a first Policy Based Routing (PBR) entry for the first packet. The first PBR entry is configured to provide for the forwarding of at least one second packet received from the destination device and directed to the source device, and that first PBR is stored in a Ternary Content Addressable Memory (TCAM) in the networking device.

20 Claims, 4 Drawing Sheets

HASH COLLISION MITIGATION SYSTEM

BACKGROUND

The present disclosure relates generally to information handling systems, and more particularly to providing for the forwarding of packets when those packets result in hash collisions in a hash forwarding table in the information handling system As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, often utilize forwarding tables for forwarding packets from source devices to destination devices. In some situations, the forwarding tables are provided by hash tables that utilize hash values generated from received packets via a hash function operating on one or more fields from the packet (referred to as the "hash key"), with those hash values associated in the hash tables with forwarding information that may be utilized to forward subsequent packets that generate matching hash values via hash operations performed using the same hash function. However, as would be understood by one of skill in the art in possession of the present disclosure, hash functions utilized to perform hash operations on packets received by the switch device can occasionally result in a hash collision in which the performance of the hash operation using the hash function on different packets (e.g., sent from different devices) provides the same hash value, a scenario that becomes more likely as the hash forwarding table approaches capacity.

For example, forwarding tables for providing Layer 2 forwarding using Media Access Control (MAC) addresses, Virtual Local Area Network (VLAN) identifiers, 32-bit Internet Protocol version 4 (IPv4) addresses, and 128-bit Internet Protocol version 6 (IPv6) addresses are commonly implemented using hash tables, with 32-bit IPv4 addresses and 128-bit IPv6 addresses commonly used for Address Resolution Protocol (ARP) entries, Neighbor Discovery Protocol (NDP) entries, host route entries, and any cast address entries. In the event that a hash collision occurs when attempting to add a forwarding table entry, the entry cannot be added to the hash forwarding table, results in inefficient operations by the switch device. For example, with regard to packets forwarded at Layer 2 using MAC addresses and VLAN identifiers, a hash collision may result in the switch device performing packet flooding operations because the MAC address and VLAN to which the packet is destined remains unknown. Similarly, there may be software interruptions by packets received from that same MAC address and VLAN identifier as those packets operate to trigger learning operations.

With regard to packets transmitted using IP addresses, a hash collision may result in the switch device utilizing software techniques to perform forwarding, as software may be unable to program resolved ARP entries and/or NDP entries in hardware. As will be appreciated by one of skill in the art, such hash collision issues will persist until the forwarding table entry that matches the hash value that caused the hash collision is no longer needed (e.g., due to a MAC address aging out, due to an ARP/NDP entry no longer being needed, etc.). As such, hash collision issues typically persist and often do not get resolved on their own. As will be appreciated by one of skill in the art, for the Layer 2 forwarding discussed above, the behavior described is performed by a VLAN-aware switch where both the MAC destination address and VLAN identifier are used for forwarding, and the MAC source address and VLAN identifier are used for learning, with the VLAN identifier having an internal, normalized representation in some devices. Further, in a VLAN-unaware switch, only the MAC destination address may be used for forwarding, and the MAC source address used for learning.

The conventional solution to address hash collisions is to provide for a plurality of entries for any particular hash value forwarding entry in the hash forwarding table (e.g., n buckets for each hash value forwarding entry, n simultaneous hash polynomials, etc.) However, such solutions must still deal with the fact that (n+1) hash collisions are always possible and can result in a hash collision in which a hash value generated for the key cannot be added as an entry to the hash table. In such situations, Application Specific Integrated Circuit (ASIC) solutions may be employed that include switching a Cyclic Redundancy Check (CRC) mechanism (e.g., between CRC-16 and CRC-32), modifying bits used from the hash function/hash operation, modifying the hash polynomial, or changing the IP address(es) that resulted in the hash collision (a solution that does not work with MAC addresses and VLAN identifiers), each of which one of skill in the art will recognize is relatively disruptive to the normal operation of the switch device.

Accordingly, it would be desirable to provide an improved solution for hash collisions that occur when adding forwarding entries to a hash table in a packet routing system.

SUMMARY

According to one embodiment, an Information Handling System (IHS) includes a processing system; and a memory system that is coupled to the processing system and that includes instructions that, when executed by the processing system, cause the processing system to provide a switch engine that is configured to: receive, from a source device, a first packet; perform, using first packet information included in the first packet, a hash operation to generate a hash value; determine that the hash value has caused a hash collision with a first hash value forwarding entry in a hash forwarding table; generate, in response to determining that the hash value has caused a hash collision, a first Policy Based Routing (PBR) entry for the first packet, wherein the first PBR entry is configured to provide for the forwarding of at least one second packet directed to the source device; and store the first PBR entry in a Ternary Content Addressable Memory (TCAM).

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
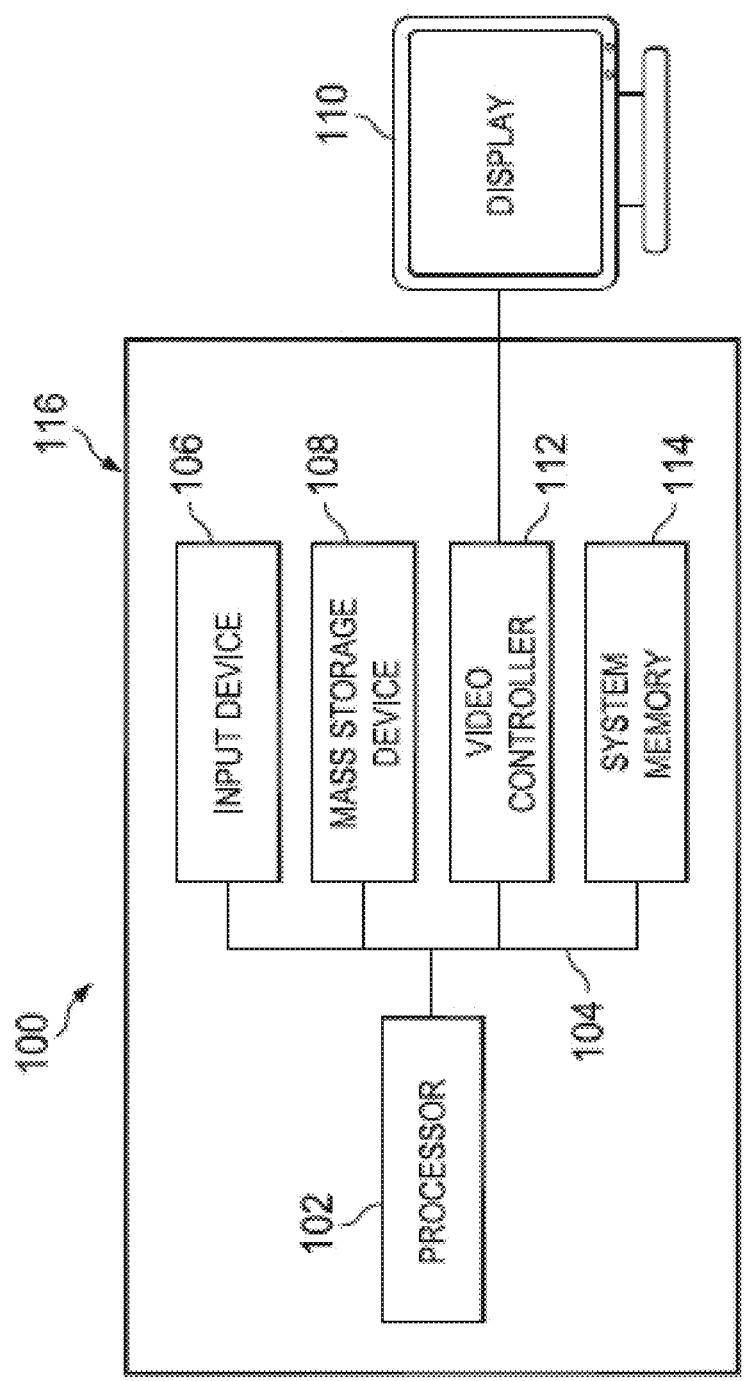
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
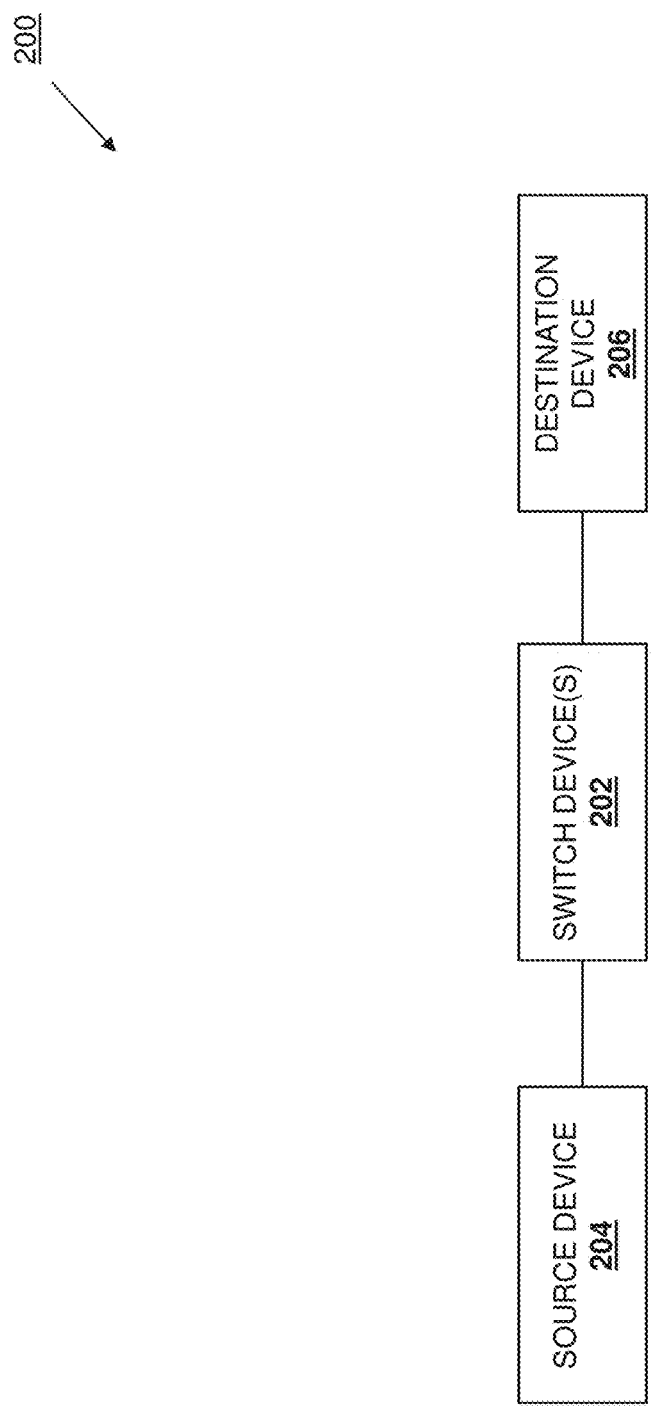
FIG. 2 is a schematic view illustrating an embodiment of networked system.

Referring now to FIG. 2, an embodiment of a networked system 200 is illustrated. In the illustrated embodiment, the networked system 200 includes a plurality of switch devices 202, any or all of which may be configured to provide the hash collision mitigation system of the present disclosure. In an embodiment, any or all the switch devices 202 may be provided by the IHS 100 discussed above with reference to FIG. 1, and/or may include some or all of the components of the IHS 100. However, while illustrated and discussed as a switch device 202, one of skill in the art in possession of the present disclosure will recognize that switch device(s) provided in the networked system 200 may include any networking devices that may be configured to operate similarly as the switch device 202 discussed below.

The switch device(s) 202 are coupled to a source device 204. In an embodiment, the source device 204 may be provided by the IHS 100 discussed above with reference to FIG. 1, and/or may include some or all of the components of the IHS 100. For example, the source device 204 may include a server device, a desktop computing device, a laptop/notebook computing device, a tablet computing device, a mobile phone, and/or any of a variety of other computing devices that would be apparent to one of skill in the art in possession of the present disclosure. The switch device(s) 202 also couple a destination device 206 to the source device 204. In an embodiment, the destination device 206 may be provided by the IHS 100 discussed above with reference to FIG. 1, and/or may include some or all of the components of the IHS 100. For example, the destination device 206 may include a server device, a desktop computing device, a laptop/notebook computing device, a tablet computing device, a mobile phone, and/or any of a variety of other computing devices that would be apparent to one of skill in the art in possession of the present disclosure. While a single source device 204 and destination device 206 are illustrated in FIG. 2, one of skill in the art in possession of the present disclosure will recognize that the switch device(s) 202 may (and typically will) couple together many more devices (e.g., in a datacenter) while remaining within the scope of the present disclosure. While a specific networked system 200 has been illustrated and described, one of skill in the art in possession of the present disclosure will recognize that the networked system of the present disclosure may include a variety of components and component configurations while remaining within the scope of the present disclosure as well.

Figure 3:
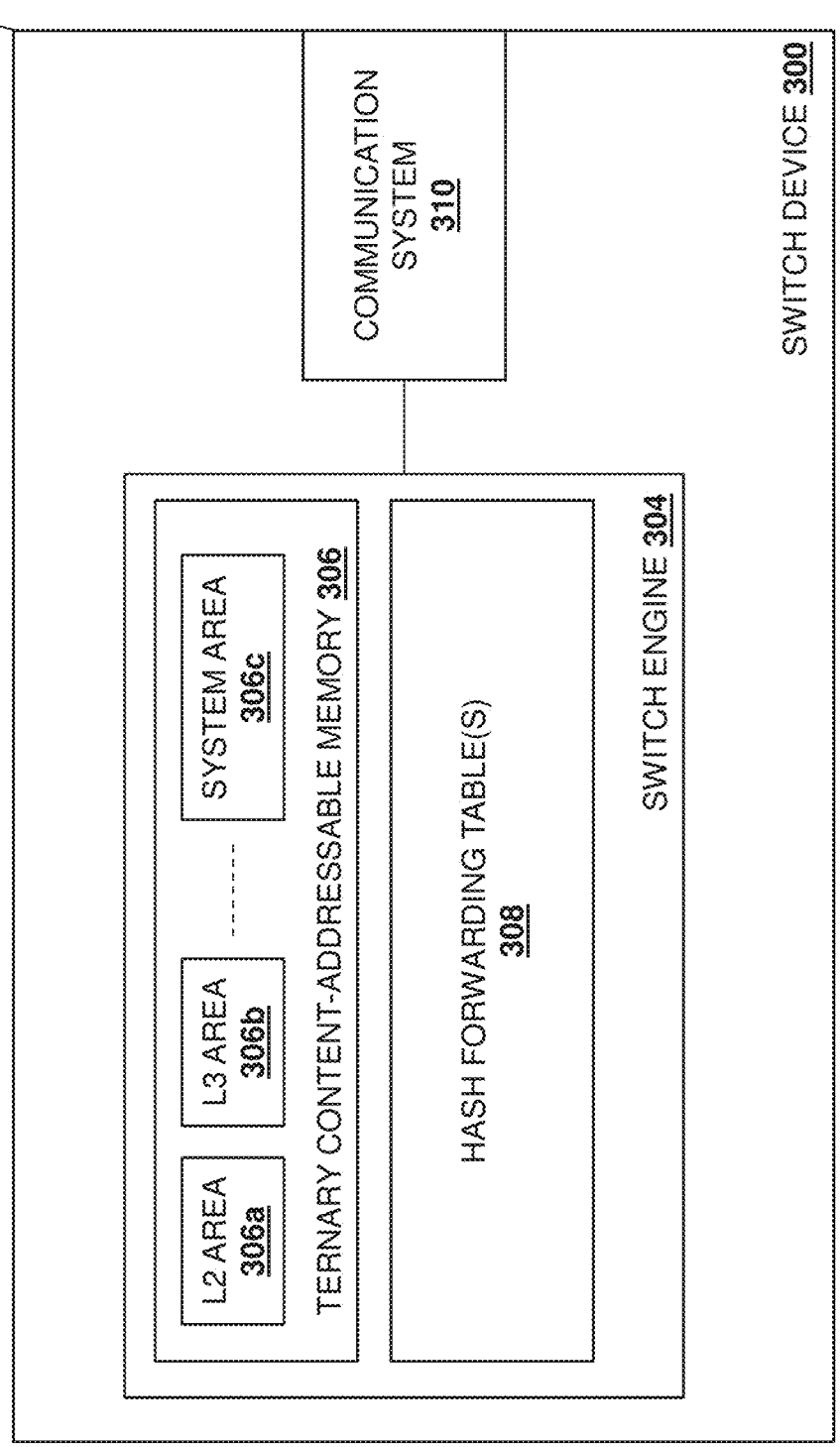
FIG. 3 is a schematic view illustrating an embodiment of a switch device that may be provided in the networked system of FIG. 2.

Referring now to FIG. 3, an embodiment of a switch device 300 is illustrated that may provide any of the switch devices 202 discussed above with reference to FIG. 2. As such, the switch device 300 may be provided by the IHS 100 discussed above with reference to FIG. 1 and/or may include some or all of the components of the IHS 100. Furthermore, while illustrated and discussed as a switch device 300, one of skill in the art in possession of the present disclosure will recognize that the functionality of the switch device 300 discussed below may be provided by other networking devices that are configured to operate similarly as the switch device 300 discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switch engine 304 that is configured to perform the functionality of the switch engines and/or switch devices discussed below.

The chassis 302 may also house a storage system (not illustrated, but which may include the storage 108 discussed above with reference to FIG. 1) that is coupled to and/or integrated with the switch engine 304 (e.g., via a coupling between the storage system and the processing system). For example, FIG. 3 illustrates how a Ternary Content Addressable Memory (TCAM) 306 may be integrated as part of the switch engine 304 via, for example, a portion of the memory system utilized to provide the switch engine 304, a portion of the storage system, etc. In a specific example, the TCAM 306 may be provided by a conventionally sized TCAM that is configured to store on the order of thousands of Access Control List (ACL) entries (e.g., rather than larger, more expensive TCAMs that are capable of storing more entries (e.g., on the order of hundreds of thousands or millions of ACL entries) and that are typically provided external to the switch engine 304). However, one of skill in the art in possession of the present disclosure will appreciate that the TCAM 306 may be provided in switch device 300 (e.g., integrated with the switch engine 304, coupled to the switch engine 304, etc.) in a variety of manners and with a variety of capabilities that will fall within the scope of the present disclosure as well. In the illustrated embodiment, the TCAM 306 includes a plurality of TCAM areas including a Layer 2 (L2) area 302a that, as discussed below, may be configured to include L2 packet routing entries; a Layer 3 (L3) area 302b that, as discussed below, may be configured to include L3 packet routing entries, and up to a system area 302c that one of skill in the art in possession of the present disclosure will recognize is conventionally utilized for redirecting packets to the processing system (e.g., a Central Processing Unit (CPU)). However, while a specific TCAM 306 with particular areas are illustrated and described, one of skill in the art in possession of the present disclosure will recognize that the TCAM 306 utilized in the present disclosure may include a variety of areas and/or area configurations while remaining within the scope of the present disclosure as well.

FIG. 3 also illustrates how one or more hash forwarding tables 308 may be integrated as part of the switch engine 304 via, for example, a portion of the memory system utilized to provide the switch engine 304, a portion of the storage system, etc. In a specific example, the hash forwarding table(s) 308 may be provided by a conventionally sized hash forwarding tables (e.g., L2 forwarding tables, L3 forwarding tables, etc.) that are configured to store on the order of hundreds of thousands of entries. However, one of skill in the art in possession of the present disclosure will appreciate that the hash forwarding table(s) 308 may be provided in switch device 300 (e.g., integrated with the switch engine 304, coupled to the switch engine 304, etc.) in a variety of manners and with a variety of capabilities that will fall within the scope of the present disclosure as well. As would be understood by one of skill in the art in possession of the present disclosure, the hash forwarding table(s) 308 may utilize hash values generated from received packets via a hash function operating on one or more fields from the packet (referred to as the "hash key"), with those hash values associated with forwarding information that may be utilized to forward subsequent packets that generate matching hash values via the same hash function/hash operation. However, while specific hash forwarding table(s) 308 are illustrated and described, one of skill in the art in possession of the present disclosure will recognize that the hash forwarding table(s) 308 utilized in the present disclosure may enable a variety of functionality while remaining within the scope of the present disclosure as well.

The chassis 302 may also house a communication system 310 that is coupled to the switch engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 310 may include any of the ports on the switch device(s) 202/300 discussed below while remaining within the scope of the present disclosure. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switching device functionality, as well as the functionality discussed below, while remaining within the scope of the present disclosure as well.

Figure 4:
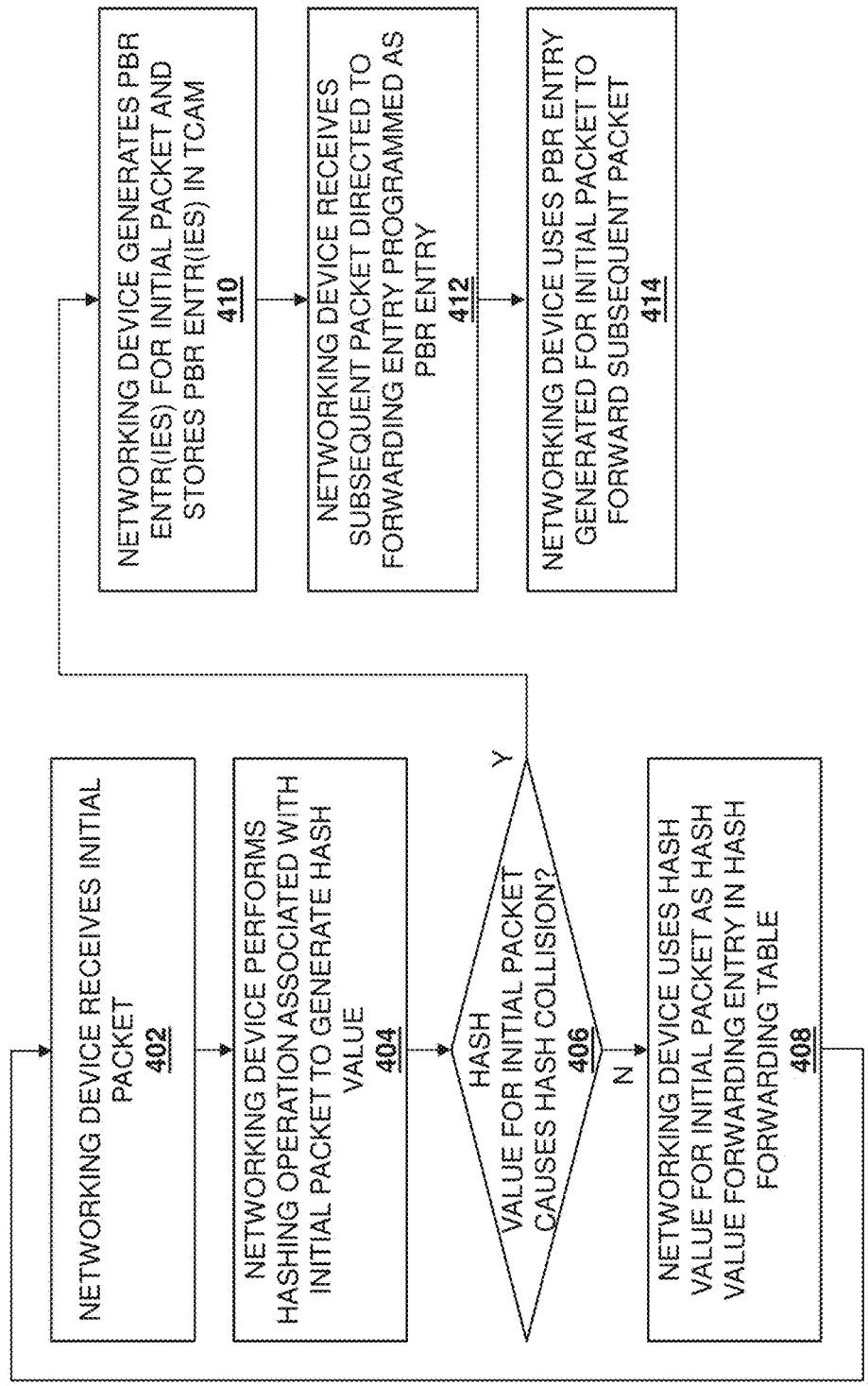
FIG. 4 is a flow chart illustrating an embodiment of a method for forwarding packets based on hash collisions.

Referring now to FIG. 4, an embodiment of a method 400 for forwarding packets based on hash collisions is illustrated. As discussed below, the systems and methods of the present disclosure provide for the generation and storage of PBR entries in a TCAM in the event a hash operation on a received packet provides a hash value that results in a hash collision with an existing hash value in a hash forwarding table. Subsequent packets may then be forwarded using the PBR entries, which allows for the forwarding of those packets associated with the hash collision. For example, in the case of L2 packets utilizing MAC addresses and VLAN identifiers for forwarding, PBR entries generated and stored for an L2 packet associated with a hash collision may include a first PBR entry that provides for the forwarding of subsequent L2 packets as discussed above, a second PBR entry that provides for the aging of the MAC address utilized in the first PBR entry, and a third PBR entry that allows for the movement of the MAC address utilized in the first PBR entry. In the case of L3 packets utilizing IP addresses, a PBR entry generated and stored for the L3 packet may include a PBR entry that provides for the forwarding of subsequent L3 packets as discussed above. In some embodiments, the method 400 may provide for the detection of the removal of hash value forwarding entries that are associated with hash collisions from the hash forwarding table, which allows hash value forwarding entries to be provided in the hash forwarding table for the PBR entries that were generated as a result of those hash collisions, and the removal of those PBR entries from the TCAM. As such, packet forwarding for packets that are associated with hash collisions is enabled in a manner that is not disruptive to the networking device that manages and performs that forwarding.

The method 400 begins at block 402 where a networking device receives an initial packet. In an embodiment, the initial packet may be received from a source device and may be directed to a destination device. As will be appreciated by one of skill in the art in possession of the present disclosure, block 402 may be performed in embodiments that utilize L2 forwarding, and may be omitted in embodiments that utilize L3 forwarding. In an embodiment, at block 402, the source device 204 may generate and transmit a packet to the destination device 206 via the switch device(s) 202 and, as such, any of those switch device(s) 202 may receive that packet, either directly from the source device 204 (e.g., when that switch device 202 is directly connected to the source device 204) or from one of the other switch device(s) 202 (e.g., when that switch device 202 is coupled to the source device 204 via one or more of the other switch device(s) 202. As such, at block 402, the switch engine 304 in any of the switch device(s) 202/300 may receive the packet transmitted by the source device 202 via its communication system 310 at block 402. In the example described according to the embodiment of the method 400 illustrated in FIG. 4, the switch engine 304 in the switch device 202/300 receives an "initial packet" from the source device 204 that may be the first packet received by that switch device 202/300 from the source device 204. However, one of skill in the art in possession of the present disclosure will recognize that the source device 204 may transmit many packets via the switch device 202/300, and as discussed below, the method 400 may handle those packets while remaining within the scope of the present disclosure as well. However, while discussed as being generated by the source device 204, in other embodiments, the initial packet may be received from a control protocol. Furthermore, rather than the initial packet discussed above, a configuration command may be received from an administrator of the networking device at block 402. One of skill in the art in possession of the present disclosure will recognize that the control protocol initial packet, the configuration command, and/or other data communication techniques may be utilized in the method 400 in a manner similar to the source device initial packet discussed below.

In some of the examples discussed below, the packet received by the switch engine 304 in the switch device 202/300 may be a Layer 2 (L2) packet that may include a Media Access Control (MAC) source address utilized by the source device 204, a MAC destination address utilized by the destination device 206, a Virtual Local Area Network (VLAN) identifier for a VLAN that one of skill in the art in possession of the present disclosure will recognize may be provided by a broadcast domain that is partitioned and isolated in the network at Layer 2, as well as any other L2 packet information that would be apparent to one of skill in the art in possession of the present disclosure. In other examples discussed below, the packet received by the switch engine 304 in the switch device 202/300 may be a Layer 3 (L3) packet that may include an Internet Protocol (IP) source address utilized by the source device 204, an IP destination address utilized by the destination device 206, as well as any other L3 packet information that would be apparent to one of skill in the art in possession of the present disclosure. In specific examples of L3 packet information, the IP addresses included in the L3 packet may be provided by 32-bit IPv4 addresses or 128-bit IPv6 addresses. However, while a few specific examples of packets and packet information have been described, one of skill in the art in possession of the present disclosure will recognize how other types of packets and/or other packet information will fall within the scope of the present disclosure as well.

The method 400 then proceeds to block 404 where the networking device performs a hash operation associated with the initial packet to generate a hash value. In an embodiment, at block 404, the switch engine 304 in the switch device 202/300 may operate to utilize a hash function in order to perform a hash operation on the packet received at block 402. As would be appreciated by one of skill in the art in possession of the present disclosure, a hash function may be utilized to perform a hash operation on any arbitrary sized data in order to map that data to fixed sized data. For example, hash functions may be utilized by the switch engine 304 in the switch device 202/300 on packet information in the packet received at block 402 (e.g., packet information included in a packet header of the packet, using the upper or lower bits of a CRC-16 or CRC-32 operation on the hash key) in order to generate a hash value that has a fixed size. In a specific example, the hash operation performed by the switch engine 304 in the switch device 202/300 using the hash function may include performing a hash operation on a MAC source address included in the packet along with a VLAN identifier included in the packet, or on a MAC destination address included in the packet along with a VLAN identifier included in the packet for Layer 2 learning and forwarding, respectively, or on an IP destination address included in the packet for Layer 3 forwarding, or on a sender protocol address in ARP request packets, or on a target protocol address in ARP reply packets, or on the target address in NDP Neighbor Advertisement packets, or on the source IP address in NDP Neighbor Advertisement packets, and/or on any other packet information included in the packet in order to generate the hash value at block 404. Furthermore, one of skill in the art in possession of the present disclosure will recognize how block 404 may be performed using the configuration commands discussed above (rather than the packets described herein) that may be received from an administrator of the networking device at block 402.

The method 400 then proceeds to decision block 406 where the networking device determines whether the hash value for the initial packet causes a hash collision. As will be appreciated by one of skill in the art in possession of the present disclosure, prior to or during the method 400, the switch engine 304 in the switch device 202/300 may receive packets, utilize the hash function on packet information included in each of those packets to generate respective hash values that do not result in a hash collision (discussed in further detail below) and, in response, provide those respective hash values as forwarding entries in the hash forwarding table(s) 308 in association with packet forwarding information that details how subsequent packets should be forwarded if hash operations performed on packet information in those subsequent packets result in a hash value that matches the hash value of the forwarding entry associated with that packet forwarding information. As such, in an embodiment of decision block 406, the switch engine 304 in the switch device 202/300 may compare the hash value generated at block 404 with each of the hash value forwarding entries that are included in the hash forwarding table(s) 308 in order to determine whether that hash value generated at block 404 causes a hash collision by matching one of those hash value forwarding entries.

As discussed above, hash operations performed on two different packets (e.g., two packets including different packet information such as, for example, different MAC source addresses and VLAN identifiers, different IP source addresses, etc.) using a hash function can occasionally generate the same hash value, which is an issue that becomes more common as the hash forwarding table approaches capacity (e.g., there is a higher probability of collisions when the table is 90% utilized versus when it is 50% utilized). As such, an initial packet received (e.g., from a first source device) may have a hash value generated and utilized as the hash value forwarding entry for that packet in the hash forwarding table(s) 308, while the subsequent packet received (e.g., from a second source device that is different than the first source device) may have that hash value generated, which will cause a hash collision due to two different packets (e.g., sent by two different source devices) generating the same hash value. As discussed above, the generation of the hash value using packet information in the subsequent packet prevents that hash value from being added as a hash value forwarding entry to the hash value forwarding table because that hash value is already being used for an existing hash value forwarding entry. As will be appreciated by one of skill in the art in possession of the present disclosure, decision block 406 operates to determine when such a hash collision is caused by a hash value generated from the packet received at block 402.

If, at decision block 406, the networking device determines that the hash value for the initial packet does not cause a hash collision, the method 400 proceeds to block 408 where the networking device uses the hash value for the initial packet as a hash value forwarding entry in a hash forwarding table. In an embodiment, at block 408 and similarly as discussed above, a determination by the switch engine 304 in the switch device 202/300 that the hash value generated at block 404 does not cause a hash collision will result in the switch engine 304 providing that hash value as a hash value for a forwarding entry in the hash forwarding table(s) 308, along with any of a variety of packet forwarding information that would be apparent to one of skill in the art in possession of the present disclosure. The method 400 then returns to block 402. As such, the method 400 may operate to loop through blocks 402, 404, 406, and 408 such that the switch device 202 receives packets, performs hash operations on those packets to generate hash values, and adds those hash values as hash value forwarding entries to the hash forwarding table(s) 308 as long as those hash values do not cause hash collisions.

If at decision block 406, the networking device determines that the hash value generated for the initial packet causes a hash collision, the method 400 proceeds to block 410 where the networking device generates one or more PBR entries for the initial packet and stores the PBR entry(ies) in a TCAM. In an embodiment, at block 410, a determination by the switch engine 304 in the switch device 202/300 that the hash value generated at block 404 causes a hash collision will result in the switch engine 304 generating one or more PBR entries an storing those PBR entry(ies) in the TCAM 306. As would be understood by one of skill in the art in possession of the present disclosure, Policy Based Routing (PBR) is a routing technique used to make routing decisions based on policies that may be defined by a network administrator or other user of the switch device 202. For example, the hash forwarding table(s) 308 provides for routing decisions for packets by hash packet information in those packets to generate a hash value, and then identifying a hash value forwarding entry in the hash forwarding table(s) 308 using that hash value, and using packet forwarding information associated in the hash forwarding table with that hash value forwarding entry. However, in situations where a hash value generated from a packet causes a hash collision, a policy may be defined using the information in that packet in order to provide for the forwarding of subsequent packets.

The inventors of the present disclosure have found that the number of hash collisions occurring in the hash forwarding table of a conventional switch device is relatively low (e.g., less than 50 hash collisions, even with relatively high utilization of the hash forwarding tables), and thus a conventional TCAM with a relatively low storage capacity (e.g., with a capacity of thousands of ACL entries) may be utilized for the PBR entries that deal with those hash collisions without requiring a storage capacity increase that may be cost prohibitive. As such, one of skill in the art in possession of the present disclosure will recognize that a conventionally sized TCAM may enable the functionality of present disclosure, which only requires a relatively low number of PBR entries in order to handle hash collisions in the hash forwarding table(s) 308.

Continuing the example above in which the packet received at block 402 is an L2 packet, in a conventional system the hash collision discussed above will prevent the hash value generated from the packet received at block 402 from being added to the hash forwarding table(s) 308, and would otherwise conventionally result in packet flooding operations that then flood that packet via all the ports that belong to the VLAN identified in that packet based on a packet flood entry that is obtained because of a miss on the hash forwarding table 308. However, at block 410, the switch engine 304 in the switch device 202/300 may generate a first PBR entry that includes a key that includes a MAC destination address that is provided by the MAC source address that was included in the packet received at block 402, and the VLAN identifier that was included in the packet received at block 402, along with a result that includes a port identifier that identifies the port in the communication system 310 upon which the packet was received at block 402. The switch engine 304 may then provide that first PBR entry at the bottom of a list of PBR entries that are included in the L2 area 306a of the TCAM 306, which one of skill in the art in possession of the present disclosure will recognize will allow the previously existing PBR entries to take priority over the first PBR entry added to the L2 area 306a of the TCAM 306 at block 410, and that will operate to override the packet flood entry in the hash forwarding table(s) 308, discussed above.

One of skill in the art in possession of the present disclosure will recognize that the above discussions apply to unicast data traffic. However, in the case of multicast data traffic, multicast addresses in the hash table are learned from control protocols such as the Generic VLAN Registration Protocol (GVRP)/Multiple VLAN Registration Protocol (MVRP), the Internet Group Management Protocol (IGMP)/Multicast Listener Discovery (MLD) snooping, and/or using other technique known in the art. As such, one of skill in the art in possession of the present disclosure will appreciate that the entries in the hash tables may be linked to a set of ports, and the PBR entries discussed above for unicast data traffic may be utilized with such multicast data traffic as well (e.g., without the need to provide the entries discussed above for learning and aging.)

While the first PBR entry is discussed as identifying the port in the communication system 310 upon which the packet was received at block 402, one of skill in the art in possession of the present disclosure will recognize that the first PBR entry may instead identify a Link Aggregation Group (LAG) in the communication system 310 upon which the packet was received at block 402, a Virtual Extensible Local Area Network (VXLAN) tunnel in the communication system 310 upon which the packet was received at block 402, and/or any other interface that one of skill in the art in possession of the present disclosure will recognize as being capable of receiving a packet. Furthermore, in specific examples in which the VXLAN tunnel discussed above cannot be identified in an L2 PBR entry, the switch engine 304 in the switch device 202/300 may operate to swap out one of the other colliding entries that do not use a VXLAN tunnel and program that entry as an L2 PBR entry, which allows an entry that uses a VXLAN tunnel to be accommodated in the hash forwarding table that has the capability to deal with VXLAN tunnels.

In addition, at block 410 the switch engine 304 in the switch device 202/300 may generate a second PBR entry that provides for the aging of the MAC source address that is associated with the source device 204 and that is used as the MAC destination address that is included as part of the key in the first PBR entry. For example, the second PBR entry may include a key that includes an identifier for the port in the communication system 310 upon which the packet was received at block 402a, and the MAC source address that was included in the packet received at block 402, along with a result that includes a counter that may be configured to be polled (e.g., by software) at regular time periods (e.g., every 30 seconds) to detect inactivity and age the MAC source address that was included in the packet received at block 402 and provided as the MAC destination address in the first PBR entry. The switch engine 304 may then provide that second PBR entry in the L2 area of the TCAM 306 below the first PBR entry. While the second PBR entry is discussed as identifying the port in the communication system 310 upon which the packet was received at block 402, one of skill in the art in possession of the present disclosure will recognize that the second PBR entry may instead identify a LAG in the communication system 310 upon which the packet was received at block 402, a port mask for a LAG in the communication system 310 upon which the packet was received at block 402, and/or any other interface that one of skill in the art in possession of the present disclosure will recognize as being capable of receiving a packet.

Furthermore, at block 410 the switch engine 304 in the switch device 202/300 may generate a third PBR entry that allows for the movement of the MAC source address that is associated with the source device 204 and that is used as the MAC destination address included in the key in the first PBR entry. For example, the third PBR entry may include a key that includes an identifier for any port in the communication system 310 other than the port upon which the packet was received at block 402a, and the MAC source address that was included in the packet received at block 402, along with a result that includes a "copy2cpu" command that provides for the forwarding of packets to the processing system in order to allow the processing system to adjust the first PBR entry when the third PBR entry identifies that the source device 204 has moved (i.e., based on the MAC source address that was included in the packet received at block 402 being received from a new port). In some embodiments, these packets may include metadata to indicate to the CPU the reason for the packet being forwarded. In other embodiments, these packets may be sent to a CPU queue that is dedicated for such packets. The switch engine 304 may then provide that third PBR entry in the L2 area of the TCAM 306 below the second PBR entry.

The table A below illustrates an example of a portion of a hash forwarding table is illustrated below that includes the first PBR entry that is configured to forward subsequent packets back to the source device 204, a second PBR entry that is positioned below the first PBR entry and that is configured to age the MAC address associated with the source device 204, and a third PBR entry and that is positioned below the second PBR entry and that is configured to handle situations where the source device 204 moves, with each of those PBR entries generated and stored (in the relative order illustrated, as discussed above) when the packet received at block 402 includes a MAC source address "X", a VLAN identifier "Y", and is received on a port "P" in the communication system 310:

| INGRESS PORT | MAC SA | MAC DA | VLAN | RESULT | COMMENT |
|---|---|---|---|---|---|
| * | * | X | Y | FORWARD TO PORT P | OVERRIDE FLOOD PACKET RESULT |
| P | X | * | Y | INCREMENT COUNTER AND FORWARD PER MAC TABLE LOOKUP | AGE MAC SA; COUNTER POLLED EVERY 30 S |
| * | X | * | Y | COPY2CPU AND FORWARD PER MAC TABLE LOOKUP | SEND COPY OF PACKET TO CPU WHEN MOVE DETECTED |

As discussed above, the first PBR entry may be positioned at the bottom of a list of PBR entries that are included in the L2 area of the TCAM 306 in order to allow the previously existing PBR entries to take priority over the first PBR entry added to the L2 area 306a of the TCAM 306 at block 410.

However, in situations where an existing PBR entry included in the L2 area of the TCAM 306 already uses the MAC source address included in the packet received at block 402, that existing PBR entry may be modified to provide the first PBR entry discussed above (while that PBR entry remains positioned in its existing location in the L2 area of the TCAM 306), and the second PBR entry and third PBR entry positioned below it in their relative order discussed above. For example, the table B below illustrates such an existing PBR entry prior to its modification (as discussed above) to provide the PBR entries detailed in table A above:

| INGRESS PORT | MAC SA | MAC DA | VLAN | RESULT | COMMENT |
|---|---|---|---|---|---|
| * | X | Z | Y | FORWARD TO PORT Q | EXISTING PBR ENTRY CONTAINING MAC ADDRESS X |

Table C below illustrates how the existing PBR entry in table B, above, may be modified to provide the first two PBR entries in table C below, followed by the three PBR entries of table A, above, that provide for forwarding, aging, and learning:

| INGRESS PORT | MAC SA | MAC DA | VLAN | RESULT | COMMENT |
|---|---|---|---|---|---|
| P | X | Z | Y | INCREMENT COUNTER C-X AND FORWARD TO PORT Q | EXISTING PBR ENTRY CONTAINING MAC ADDRESS X; ALSO INCREMENT ACTIVITY COUNTER FOR X |
| * | X | Z | Y | COPY2CPU AND FORWARD TO PORT Q | SEND COPY OF PACKET TO CPU WHEN MOVE DETECTED |
| * | * | X | Y | FORWARD TO PORT P | OVERRIDE FLOOD PACKET RESULT |
| P | X | * | Y | INCREMENT COUNTER C-X AND FORWARD PER MAC TABLE LOOKUP | AGE MAC SA; COUNTER POLLED EVERY 30 S |
| * | X | * | Y | COPY2CPU AND FORWARD PER MAC TABLE LOOKUP | SEND COPY OF PACKET TO CPU WHEN MOVE DETECTED |

As will be appreciated by one of skill in the art in possession of the present disclosure, the first L2 PBR entry (e.g., the forwarding entry in table A above) only effects output ports in the communication system 310 on the switch device 202/300, and may not impact Access Control Lists (ACLs) and results from other areas of the TCAM (e.g., Quality of Service (QoS) areas, user ACLs, etc.) Furthermore, in some embodiments, the method 400 may ensure that a maximum number of counters for the packet are not exceeded, but one of skill in the art in possession of the present disclosure will recognize that exceeding a number of maximum counters for a packet is a relatively rare situation, and can be dealt with by the method 400 by giving the second PBR entry (e.g., the aging entry in table A above) priority over other entries with counter(s) when allocating counter resources. Finally, in the event the L2 area 306a in the TCAM 306 is not available for the method 400, other areas in the TCAM 308 (e.g., the system area 306c that is typically used for redirecting packets to the processing system) may be utilized for the PBR entries discussed above Continuing the example above in which the packet received at block 402 is an L3 packet, in a conventional system the hash collision discussed above will prevent the associated hash value generated from the packet received at block 402 from being added to the hash forwarding table(s) 308, and will often result in a failed ARP/NDP lookup operation, followed by a processing system copy operation (e.g., "copy2cpu" operations) resulting from an IP Longest Prefix Match (LPM) operation which includes a lookup in the hash forwarding table for the 32-bit IPv4 IP destination address or IPv6 destination address in the packets being forwarded. However, at block 410 the switch engine 304 in the switch device 202/300 may generate a PBR entry that includes a key including an IP destination address identified in an ARP entry, along with a result that identifies a nexthop entry that includes a MAC destination address, VLAN identifier, and outgoing port (which may identify a physical port, a LAG, a VXLAN tunnel, and/or other interfaces similarly as discussed above.) The switch engine 304 may then provide that PBR entry at the bottom of a list of PBR entries that are included in the L3 area 306b of the TCAM 306, which one of skill in the art in possession of the present disclosure will recognize will allow the previously existing PBR entries to take priority over the PBR entry added to the L3 area 306a of the TCAM 306 at block 410, and that will operate to override the processing system copy operation, discussed above. In some embodiments, additional qualifiers may be used in the ACL entry key to ensure that the entry is hit only if the packet is being routed. Similarly as discussed above, one of skill in the art in possession of the present disclosure will appreciate that the L3 PBR entry may not impact Access Control Lists (ACLs) and results from other areas of the TCAM (e.g., Quality of Service (QoS) areas, user ACLs, etc.), as those results do not present conflicts and are provided in different tables. Finally, one of skill in the art in possession of the present disclosure will recognize that issues associated with MAC address aging and source device movement will not be present with L3 packets, as ARP aging is handled via software and is not dependent on source device inactivity.

The method 400 then proceeds to block 412 where the networking device receives a subsequent packet that is directed to device forwarding entry that is programmed as a PBR entry. As will be appreciated by one of skill in the art in possession of the present disclosure, block 412 may be performed in embodiments that utilize L2 forwarding, and may be omitted in embodiments that utilize L3 forwarding. In an embodiment, at or prior to block 412, the switch engine 304 in the switch device 202/300 may transmit the packet received at block 402 to the destination device 206 using a variety of other techniques that would be appreciated by one of skill in the art. As will be appreciated by one of skill in the art in possession of the present disclosure, if the MAC destination address and VLAN identifier is known, the switch engine 304 may forward the packet using that MAC destination address and VLAN identifier after creating the PBR entries, while if the MAC destination address unknown, the switch engine 304 may flood the packet after creating the PBR entries (e.g., in order to provide for learning operations.) In response to receiving the packet, the destination device 206 may respond by generating and transmitting a packet via the switch device(s) 202 to the source device 204. As such, at block 412, the switch engine 304 in the switch device 202/300 may receive a packet from the destination device 206 that is directed to the source device 204 (e.g., via a MAC destination address and VLAN identifiers, or IP destination address, that identifies the source device 204.) However, one of skill in the art in possession of the present disclosure will appreciate that the switch device 202 may receive packets directed to the source device 204 from a variety of different devices in the networked system 200 (not illustrated) while remaining within the scope of the prevent disclosure, and may forward those packets using the techniques similar to those described herein as well.

The method 400 then proceeds to block 414 where the networking device uses the PBR entry generated for the initial packet to forward the subsequent packet. In an embodiment, at block 414, the switch engine 304 in the switch device 202/300 may forward the packet received from the destination device 206 at block 412 to the source device 204 based on, for example, a MAC destination address or IP destination address included in that packet. Continuing the example above in which the packet received at block 402 is an L2 packet, the packet received at block 412 may be an L2 packet as well and, as such, may include a MAC destination address and a VLAN identifier. As such, at block 414, the switch engine 304 in the switch device 202/300 may utilize that MAC destination address and VLAN identifier to identify the key in the first PBR entry in the L2 area 306a of the TCAM 306 discussed above, and determine that that key is associated with the result discussed above that provides for the forwarding of that packet via the port in its communication system 310 upon which the packet was received at block 402. In response, the switch engine 304 in the switch device 202/300 may then forward the packet received at block 412 via that port in its communication system 310 to the source device 204. As such, the switch engine 304 in the switch device 202/300 may operate to forward any received packets to the source device 204 using the first L2 PBR entry in a manner similar to that described above.

Continuing the example above in which the packet received at block 402 is an L3 packet, the packet received at block 412 may be an L3 packet as well and, as such, may include an IP destination address. As such, at block 414, the switch engine 304 in the switch device 202/300 may utilize that IP destination address to identify the key in the PBR entry in the L3 area 306b of the TCAM 306 discussed above, and determine that that key is associated with the result discussed above that provides for the forwarding of that packet via the nexthop entry including a MAC destination address (of the source device 204), a VLAN identifier of a VLAN that includes the source device 204, and an outgoing port connected to the source device 204. In response, the switch engine 304 in the switch device 202/300 may then forward the packet received at block 412 via that port in its communication system 310 to the source device 204. As such, the switch engine 304 in the switch device 202/300 may operate to forward any received packets to the source device 204 using the L3 PBR entry in a manner to that described above. While one of skill in the art in possession of the present disclosure will recognize that the nexthop entry above identifies a port, it will be appreciated that L2 result entries or L3 nexthop entries may identify a tunnel (e.g., a VXLAN tunnel or other tunnels known in the art), and those tunnels may be identified by the PBR entries discussed above (which may be followed by with learning entries and/or aging entries discussed above, if needed.)

As discussed above, in addition to forwarding packets using the PBR entry(ies), PBR entries may be utilized to deal with MAC address aging and detecting source device movement as well. Continuing the example above in which the packet received at block 402 is an L2 packet, subsequent packets generated and transmitted by the source device 204 may be received by the switch engine 304 in the switch device 202/300, and the switch engine 304 may utilize the second PBR entry or third PBR entry discussed above in order to deal with MAC address aging or source device movement issues, respectively. For example, the switch engine 304 in the switch device 202/300 may receive a packet from the source device 204 via the same port from which the packet was received at block 402, with that packet including a MAC source address and VLAN utilized by the source device 204. In response, the switch engine 304 in the switch device 202/300 may utilize that MAC source address, VLAN identifier, and identification of the port upon which that packet was received to identify the key in the second PBR entry in the L2 area 306a of the TCAM 306 discussed above, and determine that that key is associated with the result discussed above that provides for the incrementing of the counter discussed above. As such, the counter may be polled at regular time periods (e.g., every 30 seconds) to determine whether that MAC source address has been inactive for some predetermine period of time (e.g., 5 minutes) and, if so, all PBR entries that were added to deal with the collision of the hash value may be removed, and any modification of those PBR entries may be reversed (as in the case where there was an existing L2 PBR entry containing the MAC source address and VLAN identifier) from the L2 area 306a of the TCAM 306.

Furthermore, the switch engine 304 in the switch device 202/300 may receive a packet from the source device 204 via a port that is different than the port from which the packet was received at block 402, with that packet including a MAC source address of the source device 204. In response, the switch engine 304 in the switch device 202/300 may utilize that MAC source address and identification of the port upon which that packet was received to identify the key in the third PBR entry in the L2 area 306a of the TCAM 306 discussed above, and determine that that key is associated with the result discussed above that provides for the copying of that packet to the processing system. As will be appreciated by one of skill in the art in possession of the present disclosure, the copying of that packet to the processing system may result in the processing system modifying the first and second PBR entries based on a move of the source device 204, which may include changing the port identified in the first PBR entry, and the port in the key of the second entry, to the different/new port upon which a packet with the MAC source address and VLAN identifier were received from the source device 204.

In some embodiments, PBR entry(ies) may be removed from the TCAM 306 when the hash value forwarding entry in the hash forwarding table(s) 308 that is associated with the hash collision detected at decision block 406 is removed from the hash forwarding table(s) 308. For example, following the provisioning of any PBR entry(ies) in the TCAM 206, the switch engine 304 in the switch device 202/400 may operate to track the hash value of forwarding entries in the hash forwarding table(s) 308 that are associated with the hash collisions that caused those PBR entry(ies) to be generated. As such, when one of those hash value forwarding entries in the hash forwarding table(s) 308 is removed (e.g., due to aging, etc.), the associated PBR entry(ies) that resulted in the hash collision may be converted to hash value forwarding entries and stored in the hash forwarding table(s) 308, and those PBR entry(ies) may then be removed from the TCAM 306.

In addition, in the event the current storage capacity of the TCAM 306 begins to reach capacity (e.g., the TCAM reaches 90% of its storage capacity), the switch engine 304 in the switch device 202/300 may log a critical message or other alert, and may operate (e.g., via an on-switch-device application) to determine if a different hash function may be utilized on received packets to provide a hash value forwarding entry for the hash forwarding table(s) 308, a different set of bits from the hash value resulting from the hash operation performed on received packet may be used to provide a hash value forwarding entry for the hash forwarding table(s) 308, and/or perform a variety of other hash collision resolution techniques that would be apparent to one of skill in the art in possession of the present disclosure.

Thus, systems and methods have been described that provide for the generation and storage of PBR entries in a TCAM in the event a hash operation on a received L2 or L3 packet provides a hash value that results in a hash collision with an existing hash value forwarding entry in a hash forwarding table. Subsequent packets may then be forwarded using the PBR entries, which allows for the forwarding of those packets associated with the hash collision. In the case of L2 packets utilizing MAC addresses and VLAN identifiers, PBR entries generated and stored for an L2 packet associated with a hash collision may include a first PBR entry that provides for the forwarding of subsequent L2 packets as discussed above, a second PBR entry that provides for the aging of the MAC address utilized in the first PBR entry, and a third PBR entry that deals with the movement of the MAC address utilized in the first PBR entry. In the case of L3 packets utilizing IP addresses, a PBR entry generated and stored for the L3 packet may include a PBR entry that provides for the forwarding of subsequent L3 packets as discussed above. Furthermore, the systems and methods of the present disclosure may provide for the detection of the removal of hash value forwarding entries that are associated with hash collisions from the hash forwarding table, which allows hash value forwarding entries to be provided in the hash forwarding table for the PBR entries that were generated as a result of those hash collisions, and the removal of those PBR entries from the TCAM. As such, packet forwarding for packets that are associated with hash collisions is enabled in a manner that is not disruptive to the networking device that manages and performs that forwarding, and has been found to introduce no visible performance issue notable to a user of the system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hash-collision-based packet forwarding system, comprising:
   a source device;
   a destination device; and
   a networking device coupling the source device to the destination device, wherein the networking device is configured to:
   receive, from the source device, a first packet that is directed to the destination device;
   perform, using first packet information included in the first packet, a hash operation to generate a hash value;
   determine that the hash value has caused a hash collision with a first hash value forwarding entry in a hash forwarding table in the networking device;
   generate, in response to determining that the hash value has caused a hash collision, a first Policy Based Routing (PBR) entry for the first packet, wherein the first PBR entry is configured to provide for the forwarding of at least one second packet received from the destination device and directed to the source device; and
   store the first PBR entry in a Ternary Content Addressable Memory (TCAM) in the networking device.

2. The system of claim 1, wherein the first PBR entry is stored in a Layer 2 (L2) area of the TCAM in a lower priority position relative to a plurality of second PBR entries that were previously stored in the L2 area of the TCAM.

3. The system of claim 2, wherein the networking device is configured to:
   generate a second PBR entry that is configured to provide for the aging of an address that is associated with the source device and that is included in the first PBR entry; and
   store the second PBR entry in the L2 area of the TCAM in a lower priority position relative to the first PBR entry.

4. The system of claim 3, wherein the networking device is configured to:
   generate a third PBR entry that is configured to provide for the movement of the address that is associated with the source device and that is included in the first PBR entry; and
   store the third PBR entry in the L2 area of the TCAM in a lower priority position relative to the second PBR entry.

5. The system of claim 1, wherein the first PBR entry is stored in a Layer 3 (L3) area of the TCAM in a lower priority position relative to a plurality of second PBR entries that were previously stored in the L3 area of the TCAM.

6. The system of claim 1, wherein the networking device is configured to:
   determine that the first hash value forwarding entry associated with the hash collision has been removed from the hash forwarding table in the networking device;
   generate, in response to determining that the first hash value forwarding entry has been removed from the hash forwarding table, a second hash value forwarding entry corresponding to the first PBR entry; and
   store the second hash value forwarding entry in the hash forwarding table.

7. An Information Handling System (IHS), comprising:
   a processing system; and
   a memory system that is coupled to the processing system and that includes instructions that, when executed by the processing system, cause the processing system to provide a switch engine that is configured to:
   receive, from a source device, a first packet;
   perform, using first packet information included in the first packet, a hash operation to generate a hash value;
   determine that the hash value has caused a hash collision with a first hash value forwarding entry in a hash forwarding table;
   generate, in response to determining that the hash value has caused a hash collision, a first Policy Based Routing (PBR) entry for the first packet, wherein the first PBR entry is configured to provide for the forwarding of at least one second packet directed to the source device; and
   store the first PBR entry in a Ternary Content Addressable Memory (TCAM).

8. The IHS of claim 7, wherein the first PBR entry is stored in a Layer 2 (L2) area of the TCAM in a lower priority position relative to a plurality of second PBR entries that were previously stored in the L2 area of the TCAM.

9. The IHS of claim 8, wherein the switch engine is configured to:
  generate a second PBR entry that is configured to provide for the aging of an address that is associated with the source device and that is included in the first PBR entry; and
  store the second PBR entry in the L2 area of the TCAM in a lower priority position relative to the first PBR entry.

10. The IHS of claim 9, wherein the switch engine is configured to:
  generate a third PBR entry that is configured to provide for the movement of the address that is associated with the source device and that is included in the first PBR entry; and
  store the third PBR entry in the L2 area of the TCAM in a lower priority position relative to the second PBR entry.

11. The IHS of claim 7, wherein the first PBR entry is stored in a Layer 3 (L3) area of the TCAM in a lower priority position relative to a plurality of second PBR entries that were previously stored in the L3 area of the TCAM.

12. The IHS of claim 7, wherein the switch engine is configured to:
  determine that the first hash value forwarding entry associated with the hash collision has been removed from the hash forwarding table;
  generate, in response to determining that the first hash value forwarding entry has been removed from the hash forwarding table, a second hash value forwarding entry corresponding to the first PBR entry; and
  store the second hash value forwarding entry in the hash forwarding table.

13. The IHS of claim 7, wherein the switch engine is configured to:
  receive, subsequent to storing the first PBR entry in the TCAM, a second packet;
  perform, using second packet information included in the second packet, the hash operation and, in response, generating the hash value; and
  forward, in response to generating the hash value via the performance of the hash operation on the second packet, the second packet using the first PBR entry.

14. A method for packet forwarding based on a hash collision, comprising:
  receiving, by a networking device from a source device, a first packet;
  performing, by the networking device using first packet information included in the first packet, a hash operation to generate a hash value;
  determining, by the networking device, that the hash value has caused a hash collision with a first hash value forwarding entry in a hash forwarding table;
  generating, by the networking device in response to determining that the hash value has caused a hash collision, a first Policy Based Routing (PBR) entry for the first packet, wherein the first PBR entry is configured to provide for the forwarding of at least one second packet directed to the source device; and
  storing, by the networking device, the first PBR entry in a Ternary Content Addressable Memory (TCAM) in the networking device.

15. The method of claim 14, wherein the first PBR entry is stored in a Layer 2 (L2) area of the TCAM in a lower priority position relative to a plurality of second PBR entries that were previously stored in the L2 area of the TCAM.

16. The method of claim 15, further comprising:
  generating, by the networking device, a second PBR entry that is configured to provide for the aging of an address that is associated with the source device and that is included in the first PBR entry; and
  storing, by the networking device, the second PBR entry in the L2 area of the TCAM in a lower priority position relative to the first PBR entry.

17. The method of claim 16, further comprising:
  generating, by the networking device, a third PBR entry that is configured to provide for the movement of the address that is associated with the source device and that is included in the first PBR entry; and
  storing, by the networking device, the second PBR entry in the L2 area of the TCAM in a lower priority position relative to the second PBR entry.

18. The method of claim 14, wherein the first PBR entry is stored in a Layer 3 (L3) area of the TCAM in a lower priority position relative to a plurality of second PBR entries that were previously stored in the L3 area of the TCAM.

19. The method of claim 14, further comprising:
  determining, by the networking device, that the first hash value forwarding entry associated with the hash collision has been removed from the hash forwarding table;
  generating, by the networking device in response to determining that the first hash value forwarding entry has been removed from the hash forwarding table, a second hash value forwarding entry corresponding to the first PBR entry; and
  storing, by the networking device, the second hash value forwarding entry in the hash forwarding table.

20. The method of claim 14, further comprising:
  receiving, by the networking device subsequent to storing the first PBR entry in the TCAM, a second packet;
  performing, by the networking device using second packet information included in the second packet, the hash operation and, in response, generating the hash value; and
  forwarding, by the networking device in response to generating the hash value via the performance of the hash operation on the second packet, the second packet using the first PBR entry.

* * * * *